United States Patent
Schondorf et al.

(10) Patent No.: US 10,576,941 B2
(45) Date of Patent: Mar. 3, 2020

(54) PUMP WITH TIRE FILL ASSIST

(71) Applicant: Ford Global Technologies, LLC, Dearborn, MI (US)

(72) Inventors: Steven Yellin Schondorf, Dearborn, MI (US); John Robert Van Wiemeersch, Novi, MI (US); Robert Bruce Kleve, Dearborn, MI (US); Greg Swadling, Milford, MI (US); Dilip B. Patel, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/108,144

(22) Filed: Aug. 22, 2018

(65) Prior Publication Data
US 2018/0354470 A1 Dec. 13, 2018

Related U.S. Application Data

(62) Division of application No. 14/011,116, filed on Aug. 27, 2013, now Pat. No. 10,086,803.

(51) Int. Cl.
*B60S 5/04* (2006.01)
*B60C 23/04* (2006.01)
*G01L 17/00* (2006.01)

(52) U.S. Cl.
CPC .......... *B60S 5/046* (2013.01); *B60C 23/0479* (2013.01); *G01L 17/00* (2013.01)

(58) Field of Classification Search
CPC .... B60S 5/046; B60S 5/02; B60S 5/04; B60C 23/001; B60C 23/0486; G01L 17/00
USPC ................................ 141/38, 94, 95; 152/415
See application file for complete search history.

(56) References Cited

U.S. PATENT DOCUMENTS

| | | |
|---|---|---|
| 6,445,287 B1 | 9/2002 | Schofield et al. |
| 6,825,758 B1 | 11/2004 | Laitsaari |
| 6,826,951 B1 | 12/2004 | Schuessler, Jr. et al. |
| 7,161,476 B2 | 1/2007 | Hardman et al. |
| 7,197,422 B2 | 3/2007 | Gaunt et al. |
| 7,218,209 B2 | 5/2007 | Utter et al. |
| 7,598,851 B2 | 10/2009 | Dagci |
| 8,098,146 B2 | 1/2012 | Petrucelli et al. |
| 8,833,152 B2 * | 9/2014 | Schaefer ............. G01B 11/22 73/146.2 |
| 9,707,806 B2 * | 7/2017 | Edwards ............. B60C 23/001 |
| 10,086,803 B2 * | 10/2018 | Schondorf ......... B60C 23/0479 |
| 10,112,447 B2 * | 10/2018 | Edwards ............. B60C 23/001 |
| 2002/0030592 A1 | 3/2002 | Hakanen et al. |
| 2006/0055522 A1 | 3/2006 | Rimkus et al. |
| 2006/0220813 A1 | 10/2006 | Utter et al. |
| 2008/0266073 A1 | 10/2008 | Tu et al. |

(Continued)

*Primary Examiner* — Timothy L Maust
(74) *Attorney, Agent, or Firm* — Frank Lollo; Bejin Bieneman PLC

(57) ABSTRACT

A pump system includes a pneumatic pump, a hose, a nozzle that can attach to a tire of a vehicle, and a processing device. The processing device receives a target tire pressure for the tire, receives a current tire pressure of the tire, and controls the operation of the pneumatic pump according to the target tire pressure and the current tire pressure. A method includes receiving a target tire pressure for a tire of a vehicle, receiving a current tire pressure of the tire, and controlling operation of a pneumatic pump according to the target tire pressure and the current tire pressure.

7 Claims, 2 Drawing Sheets

(56) References Cited

U.S. PATENT DOCUMENTS

| | | |
|---|---|---|
| 2010/0207753 A1 | 8/2010 | Sugiura |
| 2011/0012722 A1 | 1/2011 | Petrucelli et al. |
| 2011/0140875 A1 | 6/2011 | Be et al. |
| 2011/0172821 A1* | 7/2011 | Carter .................... B60S 5/046 |
| | | 700/259 |
| 2011/0205047 A1 | 8/2011 | Patel et al. |
| 2012/0007730 A1 | 1/2012 | Vecht-Lifshitz et al. |
| 2012/0022801 A1 | 1/2012 | Miller et al. |
| 2012/0176233 A1 | 7/2012 | Petrucelli et al. |
| 2016/0167462 A1* | 6/2016 | Juzswik .............. B60C 23/0484 |
| | | 73/146.5 |
| 2017/0043623 A1* | 2/2017 | Bowman .................. B60C 5/22 |
| 2018/0186345 A1* | 7/2018 | Lo Presti ................ B60S 5/046 |
| 2018/0222259 A1* | 8/2018 | Janik .................... B60C 23/003 |

* cited by examiner

PUMP WITH TIRE FILL ASSIST

CROSS-REFERENCE TO RELATED APPLICATIONS

This patent application claims priority to, and all advantages of, U.S. patent application Ser. No. 14/011,116 filed on Aug. 27, 2013, the contents of which are incorporated herein by reference in their entirety.

BACKGROUND

Vehicles perform better when the tires are properly inflated. Technicians often check the tire pressure as a courtesy or as part of a maintenance procedure. Vehicle owners sometimes check and fill tires at service stations or at their homes. The recommended tire pressure is usually indicated on a placard or in the vehicle's owner's manual. Knowing the recommended tire pressure helps the vehicle owner or technician properly inflate the tires, especially because different pressures may be recommended for different types and sizes of tires.

DETAILED DESCRIPTION

An exemplary pump system includes a pneumatic pump, a hose, a nozzle that can attach to a tire of a vehicle, and a processing device. The processing device receives a target tire pressure for the tire, receives a current tire pressure of the tire, and controls the operation of the pneumatic pump according to the target tire pressure and the current tire pressure. An exemplary method includes receiving a target tire pressure for a tire of a vehicle, receiving a current tire pressure of the tire, and controlling operation of a pneumatic pump according to the target tire pressure and the current tire pressure. The exemplary pump system and method allow a user to fill the vehicle tires with the recommended volume of air.

Figure 1:
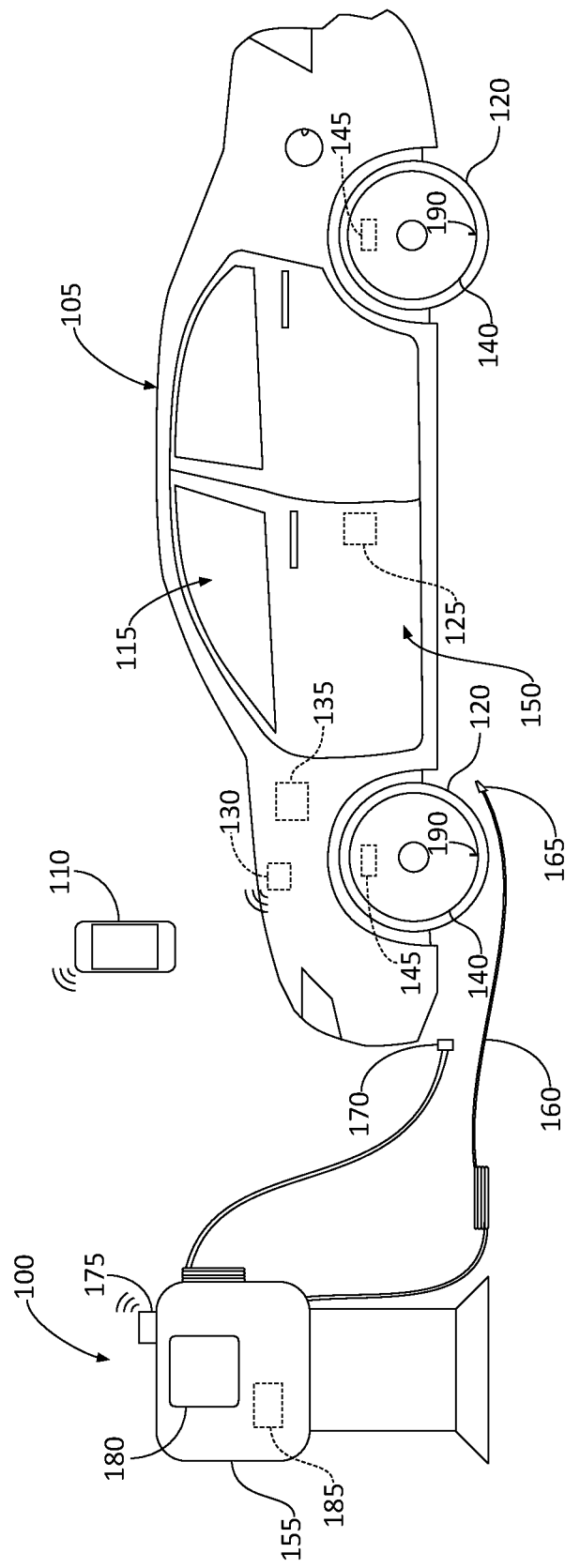
FIG. 1 illustrates an exemplary pump system for ensuring correct tire pressure.

FIG. 1 illustrates an exemplary pneumatic pump system for filling vehicle tires to a recommended air pressure. The system may take many different forms and include multiple and/or alternate components and facilities. While an exemplary system is shown, the exemplary components illustrated in the FIGS. are not intended to be limiting. Indeed, additional or alternative components and/or implementations may be used.

As illustrated in FIG. 1, the pump system 100 is configured to communicate with and provide air to a vehicle 105. The pump system 100 may be configured to communicate directly with the vehicle 105 or through a proxy, such as a mobile device 110.

The vehicle 105 may include a passenger compartment 115, tires 120, a placard 125, a communication module 130, and a vehicle processing device 135. The vehicle 105 may include other components than those shown and/or discussed herein.

The passenger compartment 115 may include any area in the vehicle 105 configured to receive passengers. The passenger compartment 115 may include seats and controls that allow an operator to control the operation of the vehicle 105. Example controls may include a steering wheel, gear shifter, pedals, etc.

The tires 120 may be configured to give the vehicle 105 traction when on a surface such as a road. The tires 120 may rest on a rim 140 and hold air. The tires 120 may be formed from various materials including synthetic or natural rubber, fabric and wire, and/or other materials and compounds. Performance of the vehicle 105 may be optimized when the tires 120 are inflated to a particular pressure, which may be referred to as the target tire pressure. One or more tire pressure monitors 145 may be configured to measure the current pressure of each tire 120. The tire pressure monitors 145 may each output various signals representing the current pressure, in real time, of a respective tire 120. The tire pressure monitors 145 may further identify which tire 120 is associated with the tire pressure monitor 145. That is, the signal generated by the tire pressure monitor 145 may include tire identification code that is unique for each tire. The tire 120 may further include a valve 190 configured to receive air from, e.g., an air compressor such as the pneumatic pump 155 discussed below.

The placard 125 may include a card located on or in the vehicle 105 such as in the passenger compartment 115 or on the inside of a door 150. In some instances, the placard 125 may be included in an owner's manual. The placard 125 may include information about the vehicle 105 such as the target tire pressure. Other information included in the placard 125 may include the make, model, and year of the vehicle 105, the vehicle 105 identification number (VIN), seating capacity, tire 120 size, maximum load, and towing capacity, among other details about the vehicle 105. The placard 125 may present the information in any human- and/or machine-readable format. For instance, the placard 125 may present the information as text, a one or two-dimensional bar code, an near field communication (NFC) tag or other wireless tag, etc. In some instances, multiple placards 125, including multiple tags, may be located on or throughout the vehicle such as on or near individual tires 120 or wheels. If the tires 120 are replaced, the placard 125 may be updated or replaced, in whole or in part, to reflect the new target tire pressure if necessary.

The communication module 130 may be configured to allow the vehicle 105 to communicate, either wirelessly or through a wired connection, with other devices such as the pump system 100, the mobile device 110, or both. The communication module 130 may implement any number of communication protocols such as radio frequency (RF), digital short range communication (DSRC), and/or Bluetooth®. In some possible implementations, the communication module 130 may be configured to transmit signals received from, e.g., the tire pressure monitors 145 according to an ultra high frequency (UHF) protocol. The communication module 130 may be further configured to receive signals transmitted from devices external to the vehicle 105 and facilitate two-way communication with such external devices. For example, the communication module 130 may be configured to receive communications from a key fob in a remote keyless entry system. Moreover, the communication module 130 may be configured to receive signals from, e.g., the pump system 100 as discussed in greater detail below. In some possible implementations, the communication module 130 may be configured to communicate in accordance with a near field communication (NFC) protocol to communicate with a mobile device 110 or any other device implementing NFC standards. For instance, when a mobile device 110 taps or is placed near an NFC-compliant tag, which may be included in the placard 125 as mentioned above, the communication module 130 may transmit and/or receive signals from the mobile device 110.

The vehicle processing device 135 may be configured to receive and process various signals generated by components in the vehicle 105. For instance, the vehicle processing device 135 may receive and process signals generated by the tire pressure monitors 145 as well as access and process information stored in one or more memory devices (not shown). Furthermore, the vehicle processing device 135 may be configured to store information in one or more of the memory devices. The vehicle processing device 135 may further receive and process signals received from external components such as the pump system 100 and the mobile device 110. The vehicle processing device 135 may also transmit signals to external components using, e.g., the communication module 130. Thus, the vehicle processing device 135 may transmit the current tire pressure for one or more tires 120 to, e.g., the pump system 100 or the mobile device 110.

The mobile device 110 may be configured to communicate with the vehicle 105, the pump system 100, or both. The mobile device 110 may be configured to receive, process, and transmit signals. In some instances, the mobile device 110 may act as a proxy between the vehicle 105 and the pump system 100. The mobile device 110 may include hardware and software to implement any number of communication protocols such as Bluetooth®, near field communication (NFC), or the like. In some possible approaches, the mobile device 110 may include and execute one or more applications that facilitate the communication with the vehicle 105, the pump system 100, or both. The mobile device 110 may further include a camera configured to capture an image of the placard 125 or otherwise access the information on the placard 125. For instance, the camera of the mobile device 110 may capture an image of text, a one or two-dimensional bar code, etc. on the placard 125, process the captured image, and output a signal representing, for example, the target tire pressure identified on the placard 125. Another possible application that may be executed by the mobile device 110 may include an application that allows the mobile device 110 to access the signals generated by the tire pressure monitors 145. This way, the mobile device 110 may be able to determine the current tire pressure of any of the tires 120 and transmit signals with the current tire pressure to, e.g., the pump system 100.

The pump system 100 may include a pneumatic pump 155, a hose 160, a nozzle 165, a placard reader 170, a communication device 175, a user interface device 180, and a pump processing device 185. The pump system 100 may not include all of these components in all implementations. For example, where the pump system 100 is configured for wireless communication, the pump system 100 may omit the placard reader 170. Including more components, however, may make the pump system 100 compatible with a greater number of vehicles 105 since not all vehicles 105 may be equipped to communicate wirelessly. The pump system 100 may include additional components such as a device to measure tire pressure (not shown) for instances where communication with the vehicle 105 is not possible.

The pneumatic pump 155 may include an air compressor configured to increase the pressure of ambient air and transport the pressurized air through the hose 160. The hose 160 may be formed from a generally flexible material with a skin that is impermeable to air. The pneumatic pump 155 may include a valve (not shown) that allows air to flow from the air compressor to an opening in the hose 160. The pneumatic pump 155 may push the pressurized air through the hose 160 and through a nozzle 165 that is configured to attach to the tire valve 190 so that the pressurized air can enter the tire 120. In some instances, the nozzle 165 may be further configured to release air from the tires 120 if, e.g., the tire pressure is higher than the recommended or target pressure. Thus, the nozzle 165 may include a pressure release valve (not shown) that may be controlled by the pump system 100.

The placard reader 170 may be configured to electronically read the information on the placard 125, owner's manual, or any other source of the target tire pressure. As discussed above, the placard 125 may present information about the vehicle 105 in a human-readable format, a machine-readable format, or both. Thus, the placard reader 170 may include an optical reader or a camera configured to capture images or text on the placard 125. In some implementations, the placard reader 170 may simply capture an image of the vehicle 105. Besides simply capturing images or text, the placard reader 170 may interpret text through, e.g., object character recognition or collect information from a one or two-dimensional bar code. Accordingly, the signal generated by the placard reader 170 may represent the image captured or alternatively one or more pieces of collected information, such as the target tire pressure, from the placard 125.

The communication device 175 may be configured to facilitate communication between the pump system 100 and other devices including the vehicle 105, the mobile device 110, or both. For example, the communication device 175 may be configured to receive radio frequency (RF) signals from the vehicle 105 and/or communicate with a mobile device 110 via, e.g., Bluetooth® or the NFC protocols. The communication device 175 may be configured to receive signals related to the current tire pressure, among other characteristics, transmitted from the vehicle 105 through the communication module 130 or from the mobile device 110. Accordingly, the communication device 175 may include a wireless interface device for wireless communication with the vehicle 105, a mobile device interface for wireless communication with the mobile device 110, or both. In some possible implementations, the communication device 175 may be further configured to facilitate communication over a packet-switched network such as the Internet. For example, the image of the vehicle 105 may be used to determine, from the Internet, the type of vehicle 105 present and the likely target tire pressure.

The user interface device 180 may be configured to present and/or receive information. For instance, the user interface device 180 may include an output device, such as a display screen, an input device, such as a keyboard, or both. In some possible approaches, the user interface device 180 may include a touchscreen display configured to both present and receive information from a user. The user interface device 180 may implement one or more graphical user interfaces to present information to the user. In some instances, the user interface device 180, through the graphical user interface, may prompt the user to provide additional information or to confirm settings such as the values on the placard 125 received from the vehicle 105 or the mobile device 110 through the placard reader 170 or communicated to the pump system 100 via the communication device 175. In addition or in the alternative, the user interface device 180 may allow the user to input the target tire pressure manually. Further, the user interface device 180 may include a payment device such as a credit card reader.

The pump processing device 185 may be configured to receive the target tire pressure and the current tire pressure and control the operation of the pneumatic pump 155 according to the target and current tire pressures. The pump processing device 185 may receive the target tire pressure via the placard reader 170 or the communication device 175 and the current tire pressure via the communication device 175. To determine which tire 120 is connected to the pneumatic pump 155, the pump processing device 185 may use the identification code broadcast by the tire pressure monitor 145. In addition or in the alternative, the pump processing device 185 may automatically identify the connected tire 120 from the current tire pressure that is changing.

Controlling the operation of the pneumatic pump 155 may include enabling the pneumatic pump 155 when the current tire pressure is less than the target tire pressure and disabling the pneumatic pump 155 when the current tire pressure is substantially equal to the target tire pressure. Moreover, controlling the operation of the pneumatic pump 155 may include disabling the pneumatic pump 155 and opening the pressure release valve to release air from the tire 120 if the current tire pressure is greater than the target tire pressure.

The pump processing device 185 may be further configured to prompt the user via the user interface device 180 to confirm the target tire pressure received from the placard reader 170, vehicle 105, or mobile device 110. The pump processing device 185 may receive the wrong target tire pressure in various situations such as if the placard 125 is outdated, which may occur if the vehicle 105 no longer has original tires and the new tires have different pressure recommendations. The pump processing device 185 may be configured to use the user-provided target tire pressure instead of the target tire pressure indicated on the placard 125.

In some possible implementations, the pump processing device 185 may be configured to determine whether calibration of the pneumatic pump 155 is needed. For instance, the pump processing device 185 may monitor the volume of air pumped by the pneumatic pump 185 and the volume of air entering the tire 120. If the two values are significantly different, the pump processing device 185 may output a signal to the user interface device 180 indicating that service of the pneumatic pump 155 may be needed.

The pump processing device 185 may be further configured to process payment information associated with use of the pump system 100. The pump processing device 185 may receive payment information through, e.g., the user interface device 180 and associate the target tire pressure with the payment information or another identifier so that the target tire pressure may be linked to the credit card or other method of payment used. If the user uses the same credit card during a subsequent trip, the pump processing device 185 may access the previously saved target tire pressure associated with the credit card and prompt the user to confirm that the target tire pressure is still accurate.

Other possible implementations may allow for the pump processing device 185 to associate a particular user and payment information with the vehicle 105. Once the vehicle has been identified from, e.g., the information on the placard 125 or a license plate, the pump processing device may automatically retrieve the payment information associated with the vehicle from a database (not shown) accessible locally or over a communication network.

In general, computing systems and/or devices, such as the vehicle processing device 135, the pump processing device 185, and the mobile device 110, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
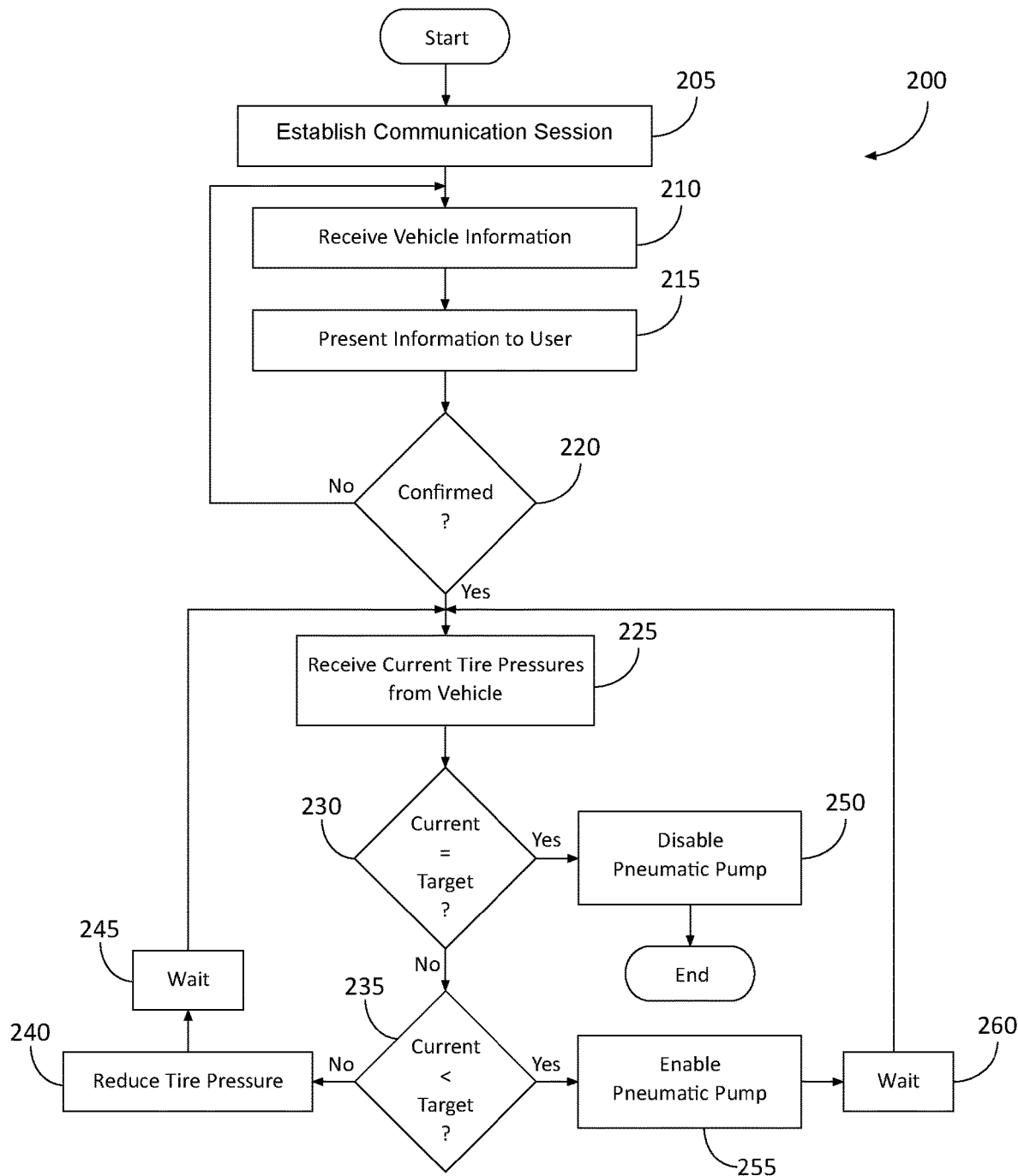
FIG. 2 illustrates a flowchart of an exemplary process that may be implemented by the system of FIG. 1.

FIG. 2 is a flowchart of an exemplary process 200 that may be implemented by one or more components of FIG. 1. For instance, the process 200 may be implemented by one or more components of the pump system 100.

At block 205, the communication device 175 may establish a communication session with the vehicle 105, the mobile device 110, or both. The communication device 175 may attempt to establish wireless communication with the vehicle 105 via, e.g., RF communication or with the mobile device 110 through Bluetooth® communication or near field communication (NFC). Establishing communication with the vehicle 105 and/or mobile device 110 may include prompting the user, via the user interface device 180, to select a vehicle 105 or mobile device 110. Prompting the user to make such a selection may be helpful if multiple vehicles 105 and/or mobile devices 110 are within a communication range of the pump system 100.

At block 210, the pump system 100 may receive information about the vehicle 105. The information may be received at the pump system 100 by the placard reader 170 or through the communication device 175. In some instances, the information may be transmitted to the pump system 100 directly from the vehicle 105 or through a proxy such as the mobile device 110. Additionally or alternatively, the pump system 100 may receive information about the vehicle 105 manually from the user through the user interface device 180.

At block 215, the pump system 100 may present some or all of the information received at block 210 to the user via the user interface device 180. For example, the user interface device 180 may present the user with the target tire pressure received at block 210. Other information besides the target tire pressure may be presented to the user as well.

At decision block 220, the pump system 100 may prompt the user to confirm whether the information presented at block 215 is correct. Instances where incorrect information may be presented at block 215 may include if the pump system 100 is in communication with a different vehicle 105 or mobile device 110 than the one belonging to the user or if the vehicle 105 has tires with different specifications than indicated on the placard 125. Knowledge that the installed tires are not the OEM specified tires may be determined from various vehicle systems and included in the information transmitted to the communication device 175. There may be other circumstances where the user wishes to override the target tire pressure so prompting the user to confirm the target tire pressure may give the user the opportunity to input a different target tire pressure than identified on the placard 125. If the target tire pressure is confirmed, the process 200 may continue at block 225. If the target tire pressure is rejected by the user, the process 200 may return to block 210 to attempt to receive the correct target tire pressure or to allow the user the opportunity to manually provide the target tire pressure.

At block 225, the pump system 100 may receive the current tire pressure for one or more tires 120. The pump system 100 may prompt the user to select which tire 120 the user intends to fill with air, and the pump system 100 may receive the current tire pressure for at least that tire 120 from either the vehicle 105 or the mobile device 110. Moreover or in the alternative, the pump processing device 185 may determine which tire 120 is being filled based on the identification codes transmitted by the tire pressure monitors 145 or from whichever current tire pressure value is changing.

At decision block 230, the pump processing device 185 may determine whether the current tire pressure received at block 225 is substantially equal to the target tire pressure confirmed at block 220. If the current tire pressure is not substantially equal to the target tire pressure, the process 200 may continue at decision block 235. If the current tire pressure is substantially equal to the target tire pressure, the process 200 may continue at block 250.

At decision block 235, the pump processing device 185 may determine whether the current tire pressure is less than the target tire pressure. If the current tire pressure is not less than the target tire pressure, the pump processing device 185 may conclude that the tire 120 has too much air so the process 200 may continue at block 240. If the current tire pressure is less than the target tire pressure, the process 200 may continue at block 255.

At block 240, the pump processing device 185 may disable the pneumatic pump 155 and cause a pressure release valve to open to remove air from the tire 120. In some instances, the nozzle 165 may be configured to mechanically open the tire valve 190 when the nozzle 165 is connected to the tire valve 190 so simply opening the pressure release valve may cause air to escape from the tire 120 without any further interaction by the pump processing device 185 or other components of the pump system 100. In other possible implementations, the pump processing device 185 may actively cause a valve in the pump system 100 or the pressure release valve to open to allow air to escape from the tire 120.

At block 245, the pump processing device 185 may wait a predetermined amount of time before returning to block 225. In some instances, the predetermined amount of time may be in the range of 100 ms to 1 s. By waiting and then returning to block 225, the pump processing device 185 can monitor the current tire pressure relative to the target tire pressure in real time.

At block 250, the pump processing device 185 may disable the pneumatic pump 155 when the current tire pressure is substantially equal to the target tire pressure. Moreover, the pump processing device 185 may close a valve in the pump system 100, such as the pressure release valve, or the tire valve 190 to prevent a significant volume of air from escaping the tire 120 after the pneumatic pump 155 has been disabled. In some instances, the process 200 may end after block 250.

At block 255, the pump processing device 185 may enable the pneumatic pump 155. Enabling the pneumatic pump 155 may cause air to flow into the tire 120 connected to the nozzle 165. While the tire 120 is connected to the nozzle 165 and the pneumatic pump 155 is enabled, the tire pressure should increase. The increasing tire pressure may be detected in real time by one of the tire pressure monitors 145.

At block 260, the pump processing device 185 may wait a predetermined amount of time before returning to block 225. In some instances, the predetermined amount of time may be in the range of 100 ms to 1 s. By waiting and then returning to block 225, the pump processing device 185 can monitor the current tire pressure relative to the target tire pressure in real time.

The process 200 may continue until the current tire pressure is substantially equal to the target tire pressure. Accordingly, comparing the target tire pressure to the current tire pressure, the pump system 100 may accurately fill one or more tires 120 of the vehicle 105 with a proper volume of air.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A pump system comprising:
a user interface device programmed to prompt a user to select one or more of a mobile device and a vehicle and to receive a first user input representing the mobile device or vehicle selected by the user, wherein the user interface device is further programmed to prompt the user to select a tire of the vehicle and to receive a second user input representing the tire selected by the user;
a pneumatic pump;
a hose attached to the pneumatic pump;
a nozzle disposed on the hose and configured to attach to the selected tire of the vehicle;
a placard reader configured to capture an image of a vehicle placard that shows a target tire pressure associated with the selected tire of the vehicle; and
a processing device configured to receive a target tire pressure for the tire from the placard reader, receive a current tire pressure of the tire wirelessly transmitted from a tire pressure monitor incorporated into the selected tire, and control operation of the pneumatic pump according to the target tire pressure and the current tire pressure.

2. The pump system of claim 1, wherein the processing device is configured to enable the pneumatic pump if the current tire pressure is less than the target tire pressure.

3. The pump system of claim 1, wherein the processing device is configured to disable the pneumatic pump if the current tire pressure is substantially equal to the target tire pressure.

4. The pump system of claim 1, wherein the processing device is configured to disable the pneumatic pump and open a pressure release valve to reduce a pressure of the tire if the current tire pressure is greater than the target tire pressure.

5. The pump system of claim 1, further comprising a wireless interface device configured to wirelessly communicate with the vehicle, wherein the wireless interface device is configured to receive at least one of the target tire pressure and the current tire pressure from the vehicle.

6. The pump system of claim 1, wherein the processing device is configured to associate payment information and the target tire pressure to the vehicle.

7. The pump system of claim 1, further comprising a mobile device interface configured to receive at least one of the target tire pressure and the current tire pressure from a mobile device in communication with the vehicle.

* * * * *